US007917948B2

(12) United States Patent
Kalimuthu et al.

(10) Patent No.: US 7,917,948 B2
(45) Date of Patent: Mar. 29, 2011

(54) METHOD AND APPARATUS FOR DYNAMICALLY SECURING VOICE AND OTHER DELAY-SENSITIVE NETWORK TRAFFIC

(75) Inventors: Ramesh Kalimuthu, Fremont, CA (US); Yogesh Kalley, Sunnyvale, CA (US); Michael L. Sullenberger, San Jose, CA (US); Jan Vilhuber, San Luis Obispo, CA (US)

(73) Assignee: Cisco Technology, Inc., San Jose, CA (US)

( * ) Notice: Subject to any disclaimer, the term of this patent is extended or adjusted under 35 U.S.C. 154(b) by 330 days.

(21) Appl. No.: 12/109,125

(22) Filed: Apr. 24, 2008

(65) Prior Publication Data
US 2008/0229095 A1 Sep. 18, 2008

Related U.S. Application Data

(60) Division of application No. 10/305,762, filed on Nov. 27, 2002, now Pat. No. 7,366,894, which is a continuation-in-part of application No. 10/247,695, filed on Sep. 18, 2002, now Pat. No. 7,447,901.

(60) Provisional application No. 60/391,745, filed on Jun. 25, 2002.

(51) Int. Cl.
*G06F 9/00* (2006.01)
*G06F 15/16* (2006.01)
(52) U.S. Cl. ............................................. 726/15; 726/12
(58) Field of Classification Search .................... 726/15, 726/12
See application file for complete search history.

(56) References Cited

U.S. PATENT DOCUMENTS

| 5,600,644 | A | 2/1997 | Chang et al. |
| 6,069,895 | A | 5/2000 | Ayandeh |
| 6,078,957 | A | 6/2000 | Adelman et al. |
| 6,172,981 | B1 | 1/2001 | Cox et al. |
| 6,175,917 | B1 | 1/2001 | Arrow et al. |
| 6,269,099 | B1 | 7/2001 | Borella et al. |

(Continued)

OTHER PUBLICATIONS

IPsec. Wikipedia, the free encyclopedia. [retrieved on Sep. 29, 2008]. Retrieved from the Internet: <URL: http://en.wikipedia.org/wiki/IPsec>.

(Continued)

*Primary Examiner* — Christopher J Brown
(74) *Attorney, Agent, or Firm* — Hickman Palermo Truong & Becker LLP

(57) ABSTRACT

A method comprises receiving a request for secure network traffic from a device having a private network address at a source node, obtaining the private network address of a requested destination device at a destination node from a route server based on signaling information associated with the request, obtaining the public network address of the destination node associated with the private network address, creating in response to the request a virtual circuit between the source node and the destination node based on the public network address of the destination node, and encrypting network traffic for transporting at least from the source node to the destination node through the virtual circuit. The process is dynamic in that the virtual circuit is created in response to the request. Hence, the process operates as if a fully meshed network exists but requires less provisioning and maintenance than a fully meshed network architecture. Furthermore, the process is readily scalable as if a hub and spoke network exists but is more suitable for delay-sensitive traffic, such as voice and video, than a hub and spoke network architecture.

15 Claims, 7 Drawing Sheets

U.S. PATENT DOCUMENTS

| | | | |
|---|---|---|---|
| 6,353,614 | B1 | 3/2002 | Borella et al. |
| 6,438,612 | B1 | 8/2002 | Ylonen et al. |
| 6,567,405 | B1 | 5/2003 | Borella et al. |
| 6,675,225 | B1 | 1/2004 | Genty et al. |
| 6,697,354 | B1 | 2/2004 | Borella et al. |
| 6,731,642 | B1 | 5/2004 | Borella et al. |
| 6,751,729 | B1 | 6/2004 | Giniger et al. |
| 6,768,743 | B1 | 7/2004 | Borella et al. |
| 6,781,982 | B1 | 8/2004 | Borella et al. |
| 6,822,957 | B1 | 11/2004 | Schuster et al. |
| 6,898,200 | B1 * | 5/2005 | Luciani ............ 370/352 |
| 6,931,010 | B2 | 8/2005 | Gallant et al. |
| 6,996,621 | B1 | 2/2006 | Borella et al. |
| 7,013,338 | B1 | 3/2006 | Nag et al. |
| 7,032,242 | B1 | 4/2006 | Grabelsky et al. |
| 7,130,854 | B2 | 10/2006 | Beadles et al. |
| 7,583,665 | B1 * | 9/2009 | Duncan et al. ........ 370/389 |
| 7,657,628 | B1 * | 2/2010 | McDysan et al. ........ 709/225 |
| 2002/0059516 | A1 | 5/2002 | Turtiainen et al. |
| 2002/0075844 | A1 | 6/2002 | Hagen |
| 2002/0080752 | A1 | 6/2002 | Johansson et al. |
| 2002/0103898 | A1 | 8/2002 | Moyer et al. |
| 2002/0114274 | A1 | 8/2002 | Struges |
| 2002/0129271 | A1 * | 9/2002 | Stanaway et al. ........ 713/201 |
| 2002/0152325 | A1 | 10/2002 | Elgebaly et al. |
| 2003/0108041 | A1 * | 6/2003 | Aysan et al. ........ 370/389 |
| 2003/0108051 | A1 | 6/2003 | Bryden et al. |
| 2003/0110288 | A1 * | 6/2003 | Ramanujan et al. ........ 709/238 |
| 2003/0163440 | A1 | 8/2003 | Tonack |
| 2004/0213206 | A1 | 10/2004 | McCormack |
| 2008/0229095 | A1 | 9/2008 | Kalimuthu et al. |

OTHER PUBLICATIONS

Welcher, Peter. Next Hop Resolution Protocol. Chesapeake Netcraftsmen. Published by the Chesapeake Netcraftsmen [online]. 1997 [retrieved on Sep. 29, 2008]. pp. 1-7. Retrieved from the Internet: <URL: http://www.netcraftsmen.net/welcher/papers/nhrp.htm>.

Hanks, et al., Generic Routing Encapsulation. RFC: 1701, Published by the Network Working Group [online]. Oct. 1994 [retrieved on Sep. 30, 2008]. pp. 1-8. Retrieved from the Internet: <URL:http://tools.ietf.org/rfc/rfc1701.txt >.

Luciani, et al., NBMA Next Hop Resolution Protocol (NHRP). RFC: 2332, Published by the Network Working Group [online]. Apr. 1998 [retrieved on Sep. 30, 2008]. pp. 1-49. Retrieved from the Internet: <URL:http://tools.ietf.org/rfc/rfc2332.txt >.

Kent, et al., Security Architecture for the Internet Protocol. RFC: 2401, Published by the Network Working Group [online]. Nov. 1998 [retrieved on Sep. 30, 2008]. pp. 1-62. Retrieved from the Internet: <URL:http://tools.ietf.org/rfc/rfc2401.txt >.

Piper, et al., The Internet IP Security Domain of Interpretation for ISAKMP. RFC:2407, Published by the Network Working Group [online]. Nov. 1998 [retrieved on Sep. 30, 2008]. pp. 1-30. Retrieved from the Internet: <URL:http://tools.ietf.org/rfc/rfc2407.txt >.

Maughan, et al., Internet Security Association and Key Management Protocol (ISAKMP). RFC: 2408, Published by the Network Working Group [online]. Nov. 1998 [retrieved on Sep. 30, 2008]. pp. 1-81. Retrieved from the Internet: <URL:http://tools.ietf.org/rfc/rfc2408.txt >.

Harkins, et al., The Internet Key Exchange. RFC: 2409, Published by the Network Working Group [online]. Nov. 1998 [retrieved on Sep. 30, 2008]. pp. 1-18. Retrieved from the Internet: <URL:http://tools.ietf.org/rfc/rfc2409.txt >.

Thayer, et al., IP Security Document Roadmap. RFC: 2411, Published by the Network Working Group [online]. Nov. 1998 [retrieved on Sep. 30, 2008]. pp. 1-11. Retrieved from the Internet: <URL:http://tools.ietf.org/rfc/rfc2411.txt >.

Fox, et al., NHRP Support for Virtual Private Networks. RFC: 2735, Published by the Network Working Group [online]. Dec. 1999 [retrieved on Sep. 30, 2008]. pp. 1-12. Retrieved from the Internet: <URL:http://tools.ietf.org/rfc/rfc2735.txt >.

Q.931 Protocol Overview. Connected: An Internet Encyclopedia. Published by the Church of the Swimming Elephant [online]. 2001 [retrieved on Sep. 30, 2008]. pp. 1-6. Retrieved from the Internet: <URL: http://www.cotse.com/CIE/Topics/126.htm>. Worcester, Massachusetts, USA.

Handley, et al., SIP: Session Initiation Protocol. RFC: 2543, Published by the Network Working Group [online]. Mar. 1999 [retrieved on Sep. 30, 2008]. pp. 1-153. Retrieved from the Internet: <URL:http://tools.ietf.org/rfc/rfc2543.txt >.

Arango, et al., Media Gateway Control Protocol (MGCP). RFC: 2705, Published by the Network Working Group [online]. Dec. 1999 [retrieved on Sep. 30, 2008]. pp. 1-134. Retrieved from the Internet: <URL:http://tools.ietf.org/rfc/rfc2705.txt >.

Chapter 3: Connecting to a Host through a Remote Access Server. Published by Cisco Systems [online]. 1997 [retrieved on Sep. 30, 2008]. pp. 1-29. Retrieved from the Internet: <URL: http://www.cisco.com/univercd/cc/td/doc/product/software/ios100/csptcg/35466.htm>.

Schulzrinne, et al., "Tutorial: The IETF Internet Telephony Architecture and Protocols," 1999, http://www.computer.org/internet/telephony/w3schrosen.htm, printed May 21, 2002, 17 pages. pp. 593-609.

International Engineering Consortium, "Trillium, H.323, 8. H.225 Registration, Admission, Status," 2002, 2 pages. pp. 610-611.

Cisco Systems, Inc., "Chapter 1, Product Overview," 1989-1998. pp. 1-1-1-10. pp. 619-630.

* cited by examiner

ASSOCIATE A NETWORK SECURITY POLICY WITH A VIRTUAL PRIVATE NETWORK INTERFACE AT A FIRST DEVICE 402

RECEIVE INPUT SPECIFYING AN ASSOCIATION OF A VIRTUAL PRIVATE NETWORK ENDPOINT ADDRESS TO A CORRESPONDING ROUTABLE NETWORK ADDRESS OF A SECOND NETWORK DEVICE 404

ISSUE A MESSAGE TO A SECURITY PROTOCOL MODULE AT THE FIRST DEVICE, WHICH INCLUDES THE ROUTABLE NETWORK ADDRESS OF THE SECOND DEVICE AND THE NETWORK SECURITY POLICY ASSOCIATED WITH THE VPN INTERFACE AT THE FIRST DEVICE 406

GENERATE ENCRYPTION STATE INFORMATION FOR TRAFFIC DIRECTED FROM THE FIRST DEVICE TO THE SECOND DEVICE, BASED ON THE MESSAGE 408

INITIATE KEY EXCHANGE TO GENERATE PAIRWISE KEYS FOR FIRST AND SECOND DEVICES 410

STORE SECURITY ASSOCIATION ASSOCIATED WITH THE FIRST AND SECOND DEVICES 412

PASS ENCRYPTED TRAFFIC ON VIRTUAL PRIVATE NETWORK AS NEEDED 414

Fig. 4

METHOD AND APPARATUS FOR DYNAMICALLY SECURING VOICE AND OTHER DELAY-SENSITIVE NETWORK TRAFFIC

BENEFIT CLAIM

This application claims the benefit as a Divisional of prior application Ser. No. 10/305,762, filed Nov. 27, 2002, now U.S. Pat. No. 7,366,894, which is a continuation-in-part of application Ser. No. 10/247,695, filed Sep. 18, 2002, now U.S. Pat. No. 7,447,901 which claimed the benefit of provisional application 60/391,745, filed Jun. 25, 2002, the entire contents of which are hereby incorporated by reference in their entirety for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention generally relates to communication networks. The invention relates more specifically to a method and apparatus for dynamically securing voice and other delay-sensitive network traffic.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Virtual Private Network

A virtual private network (VPN) is a private data network that makes use of the public packet-switched telecommunication infrastructure, maintaining privacy through the use of a tunneling protocol, such as GRE, and encryption or security protocols, such as IPsec. A virtual private network can be contrasted with a system of privately owned or leased lines that can only be used by one organization or entity. VPNs give an organization the same capabilities at much lower cost by using the shared public infrastructure rather than a private one.

Tunneling, and the use of a VPN, is not intended as a substitute for encryption/decryption. In cases where a high level of security is necessary, other encryption should be used within the VPN itself.

IPsec Protocol

The IPsec protocol and related protocols such as IKE and ISAKMP (collectively referred to as IPsec) provides a standards-based method of providing privacy, integrity, and authenticity to information transferred point-to-point among peers across IP networks, such as the public Internet and private local networks. IPsec provides IP network-layer encryption. That is, it provides security at the packet-processing layer of network communication.

IPsec defines formats of packet headers to be added to IP packets, including the authentication header (AH) to provide data integrity and the encapsulating security payload (ESP) to provide confidentiality and data integrity. Furthermore, key management and security associations are negotiated with the Internet Key Exchange (IKE). A security association (SA) is a set of IPsec parameters between two devices. Because the encrypted packets appear to be ordinary packets, they can easily be routed through any IP network without changes to the intermediate network equipment.

Several papers on various aspects of IPsec are available at the time of writing, and can be located via the document "ipsec.html" in directory "ids.by.wg" of domain "ietf.org". In addition, numerous RFCs (Request For Comment) are available from the Network Working Group of the IETF (Internet Engineering Task Force), and can be located via the document "rfc.html" of domain "ietf.org".

IPsec provides two modes of operation: transport mode and tunnel mode. In transport mode, only the IP payload is encrypted, with the original IP headers left intact. This mode adds minimal bytes to each packet. In tunnel mode, the entire original IP packet is encrypted and it becomes the payload in a new IP packet. This allows a network device, such as a router or gateway, to act as an IPsec proxy and perform encryption on behalf of the hosts. The source router or gateway encrypts packets and forwards them along the IPsec tunnel, and the destination router or gateway decrypts the original packet and forwards it to the destination host.

Hub and Spoke Network Architecture

Currently IPsec VPN networks are established using point-to-point links among routers or switches that participate in the VPNs. This is a natural way to set up encrypted networks since encryption involves establishing a shared secret between the two endpoints so that each end can decrypt what the other end has encrypted. The most efficient way to manage larger and larger collections of these point-to-point links is to arrange them into hub-and-spoke networks.

In hub-and-spoke networks, all traffic from behind one spoke to behind another spoke traverses first to the hub and then back out to the other spoke. Thus, packet latency is increased because all network traffic between end points is routed through the hub. Furthermore, secure traffic is encrypted and decrypted twice: first, between the source spoke and the hub; and second, between the hub and the destination spoke. This is because encryption/decryption keys must be exchanged between only two points. Hence, this architecture causes increased load on the hub router, which is required to perform many encryption operations.

Multicasting is communication between a single source and selected multiple destinations on a network. Teleconferencing and videoconferencing, for example, are technologies that may utilize multicasting protocols. Broadcasting is communication that is simultaneously transmitted from a source to all destinations on a network. IPsec does not readily support IP multicast or broadcast packets, due to challenges with managing the encryption keys associated with IPsec secure associations with respect to such packets.

Since IPsec does not readily support broadcasting of IP packets, it also does not support any interior dynamic routing protocol (e.g., RIP, OSPF, EIGRP), since these protocols rely on broadcasting/multicasting for their operation. Thus, currently all routing of packets over an IPsec VPN utilizes static routing. Consequently, any time there is a change, addition or removal of equipment in the network, routing information must be updated manually, which is not manageable in a large VPN network.

One technique to overcome the above multicast/broadcast restriction is to use another tunneling protocol such as GRE to first tunnel the IP data packets, including multicast/broadcast packets, and then use IPsec to encrypt (transport mode) the GRE encapsulated packets. This technique, therefore, allows the support of dynamic routing protocols and IP multicast over the VPN network. However, this technique requires the hub router to know the IP address of all the spoke routers, since the GRE tunnel endpoints are configured manually. Often, the spoke routers are connected to network via DSL or cable modem links. It is typical for such routers to be assigned an IP address dynamically, that is, each time they reboot or reload. Implementing a network in which the hub router knows the IP address of all the spoke routers increases costs significantly since the spoke routers need to have static IP addresses. Furthermore, the hub router needs to be larger with respect to, for example, configuration information and computational capability, since it will be one endpoint of all the point-to-point links and is in the path for all spoke-to-spoke traffic.

Full Mesh Network Architecture

A typical approach to solving the foregoing shortcomings of having a single hub router utilizes a static full-mesh VPN network architecture. In full-mesh architecture, each router or switch has a link to every other router or switch in the VPN. However, a static full-mesh network requires all nodes in the network to be configured with information about all other nodes in the network. The resulting configuration files are large and diffulcult to manage. Also, all nodes must set up VPN point-to-point links with all other nodes in the network by negotiating encryption keys, which are maintained at all times whether they are needed or not.

Currently, the maximum size of IPsec full mesh networks is limited by the number of simultaneous IPsec tunnels that must be supported on each node in the mesh. In practice, the limiting factor is the number of tunnels that can be supported by the smallest hardware platform used in the mesh. An additional problem is the size of the routter configuration files for mesh networks, and the size of the hub router in hub-and-spoke networks. In both cases, each configuration must include numerous lines per tunnel for defining crypto-maps, access control lists (ACLs), and definitions of tunnel interfaces for GRE tunnels. As the number of peers gets large, the configuration becomes huge.

Hence, instead of having <n> IPsec VPN links to connect <n> remote sites, there are <(n²−n)/2> IPsec VPN links to connect <n> remote sites. To support this architecture, all routers in the VPN network must be as large, in terms of processing power and storage capacity, as the hub router in the hub-and-spoke network, since all nodes must be the end point for <n> links. This significantly increases the cost to deploy the IPsec VPN network. Furthermore, the complexity of the IPsec VPN network increases dramatically, which decreases the manageability of the VPN network significantly. Also, when adding a new node to the full-mesh VPN network, all other nodes in the network must also be modified, that is, they need to be reconfigured to add information regarding connecting to the new node.

Network Configuration and Performance-General

Generally, performing encryption of any form is a CPU-intensive process and introduces latency into transmission of the traffic. Network latency represents the amount of time it takes a bit of information to travel a network link. Jitter represents the change in network latency over time and is typically measured over short periods of time.

Latency, and likewise, jitter, affect the performance of real time network applications. Most data traffic is typically tolerant to latency and jitter introduced into a packet-switched network, such as the Internet. For some applications, such as voice and video, packets need to arrive at their destination within a certain timeframe or they become useless. As a result, many voice and streaming audio and video applications can be greatly affected by significant jitter.

No prior approach to securing the transport of non-data traffic such as voice traffic is known to exist. Hence, based on the foregoing, there is a clear need for a technique for securing the transport of delay-sensitive IP traffic, such as voice traffic, which reduces the latency and CPU overhead associated with existing IP security approaches.

A Fully Meshed network configuration requires provisioning and maintaining a separate virtual circuit for each of the possible connections between all network end nodes. The number of virtual circuits required in a fully meshed network of N nodes is [(N*(N−1))/2]. Therefore, provisioning a public network such as the Internet in a fully meshed configuration for secure voice traffic is certainly not a practical endeavor, and may not even be feasible, due to the myriad of end nodes that would require such provisioning.

A Hub and Spoke configuration is more scalable than a Fully Meshed configuration, requiring only (N−1) virtual circuits. However, this configuration is not suitable for delay-sensitive traffic between spokes because of the additional hop to the hub that is required for all traffic between endpoints.

Based on the foregoing, there is a clear need for a technique for securing the transport of delay-sensitive IP traffic, such as voice traffic, which minimizes provisioning and maintenance overhead and is highly scalable.

One method of securing delay-sensitive network traffic, such as voice and video, includes efforts to change the current standard signaling and transport protocols used for voice and multimedia traffic, to include integrated security mechanisms for these types of network traffic. For example, the standards boards could be solicited to implement encryption fields in the relevant protocols. This is not considered an optimum method, especially in view of the re-provisioning that the existing network infrastructure would be expected to undergo.

Signaling Protocols

In order to provide IP telephony and multimedia capabilities in a network, a signaling protocol and signaling information are needed to perform various functions for the endpoint devices, such as session establishment, negotiation, and termination. Several protocols exist which provide the foregoing functions, for example, ITU H.323, IETF SIP (Session Initiation Protocol), IETF MGCP (Media Gateway Control Protocol), and their respective associated protocols. For example, each SIP request consists of a set of header fields that describe the call as a whole, followed by a message body that describes the individual media sessions (e.g., audio video) that make up the call, and utilizes a request/response process to establish, negotiate, and tear down a session. The actual real-time media is typically exchanged between participants using a suitable protocol, such as RTP (Real-Time Transport Protocol) for real-time media or RTSP (Real-Time Streaming Protocol) for stored media.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a flow diagram illustrating a high-level view of a process for establishing and using dynamic multipoint encrypted virtual private networks;

DETAILED DESCRIPTION

A method and apparatus for dynamically securing delay-sensitive network traffic are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

According to one aspect of the invention, a request for secure network traffic is received from a device having a private network address at a source node. The private network address of a requested destination device at a destination node is obtained from a route server, based on signaling information associated with the request. The public network address of the destination node associated with the private network address is obtained.

In one embodiment, the public network address of the destination node is obtained from a next-hop server. In another embodiment, the public network address for the destination node is obtained from a cache at the source node. In still another embodiment, the public network address for the destination node is obtained from a call setup signal, such as a multimedia call setup signal conforming to the H.225 signaling protocol.

Furthermore, in response to the request, a virtual circuit between the source node and the destination node is created based on a mapping of the public network address of the destination node and an associated virtual tunnel address. Network traffic is encrypted for transporting at least from the source node to the destination node through the virtual circuit. In one embodiment, the encryption process utilizes the IPsec Protocol.

The process is dynamic in that a virtual circuit is created in response to a request. Hence, the process operates as if a fully meshed network exists, but requires less provisioning and maintenance than a fully meshed network architecture. Furthermore, the process is readily scalable, as if a hub and spoke network exists, but is more suitable for delay-sensitive traffic than a hub and spoke network architecture.

In one embodiment, the step of creating the virtual circuit comprises the steps of encapsulating a payload packet of the network traffic with a first protocol header, e.g., GRE, which is in turn encapsulated with a second protocol header, e.g., IPsec ESP. For example, a payload packet may be encrypted and encapsulated using the IPsec protocol, and transported from the source node to the destination node through a GRE (Generic Routing Encapsulation) tunnel by encapsulating the IPsec packet using a GRE delivery protocol packet.

Operational Context

Figure 1:
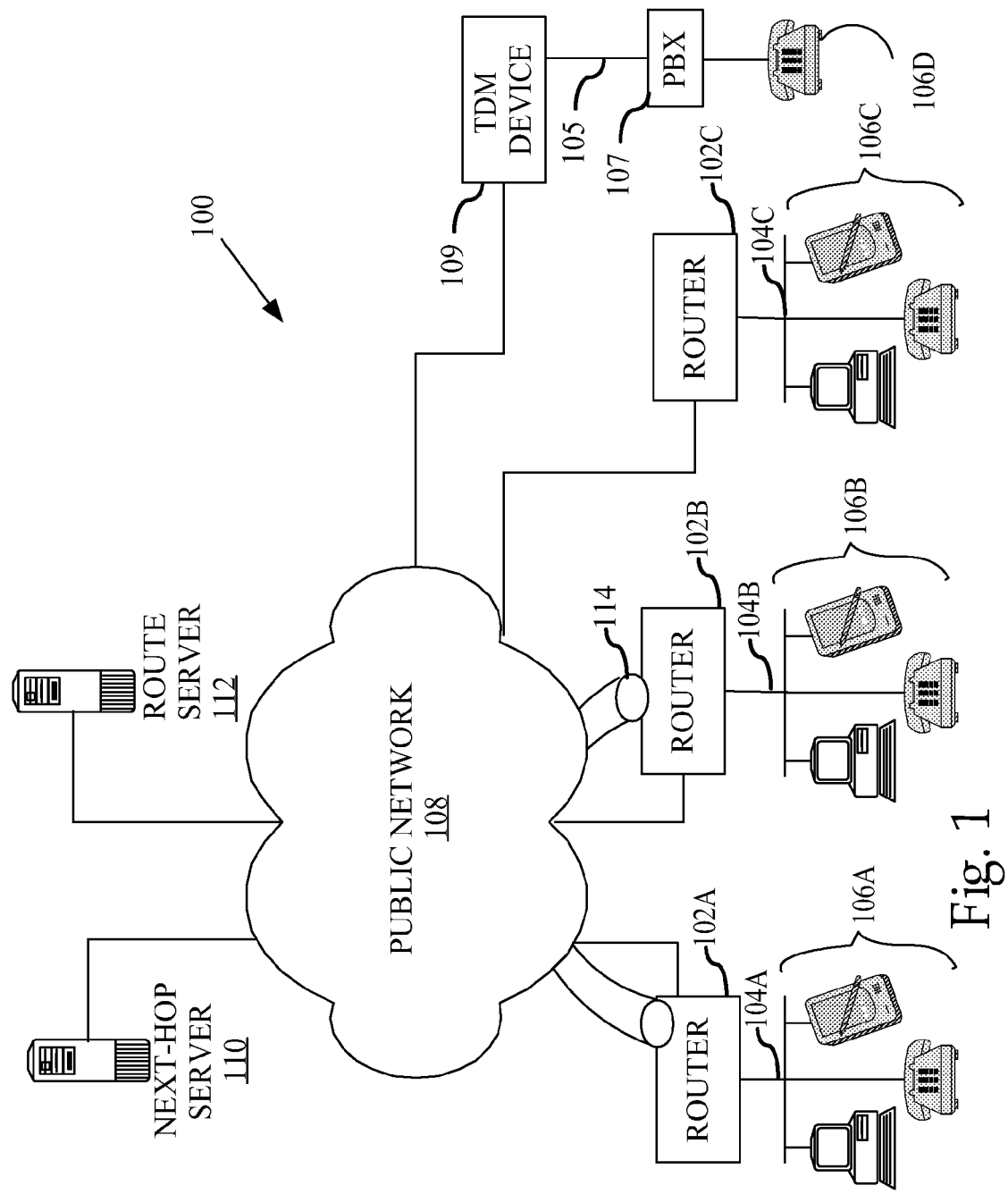
FIG. 1 is a block diagram illustrating an example of an operational environment in which an embodiment may be implemented.

FIG. 1 is a block diagram illustrating an example of an operational environment in which an embodiment may be implemented. The operational environment of FIG. 1 is described herein to provide an example context, however, it is not intended to limit the scope or use of the invention.

FIG. 1 illustrates a computer network environment 100, which comprises routers 102A, 102B, 102C communicatively coupled to respective local networks 104A, 104B, 104C and to a public network 108, such as the Internet. Each of the routers 102A, 102B, 102C can be, for example without limitation, a head-end router of a cable network or other similarly functioning broadband device, a gateway, a combination of router and gateway, a gatekeeper, or a similarly functioning device. In one embodiment, routers 102A, 102B, 102C provide a tunnel interface between a public network 108 and one or more private networks 104A, 104B, 104C. A tunnel interface is, generally, a logical interface that facilitates creation, maintenance, and tear-down of a virtual point-to-point circuit between two nodes in a network. The private networks 104A, 104B, 104C can be a LAN, implementing conventional technology such as Ethernet or token ring.

A plurality of end devices, collectively referred to as 106A, 106B, 106C, are connected to private networks 104A, 104B, 104C, respectively. Each end device 106A, 106B, 106C can be any device that is capable of communicating through a network. More specifically, in order to fully benefit from the processes described herein, the end devices should be capable of communicating with delay-sensitive traffic, such as voice, fax, or other IP telephony, video, multimedia, and the like. Non-limiting examples of end devices include IP phones, computers, workstations, personal digital assistants (PDA) or other handheld computing device, videophones, etc.

The network environment 100 further includes a next-hop server (NHS) 110 or a similarly functioning device, a route server 112 or similarly functioning device, and a virtual circuit 114. A virtual circuit 114 is also termed a tunnel or a virtual point-to-point circuit.

A next-hop server such as NHS 110 typically utilizes NHRP (Next-Hop Resolution Protocol) to maintain precise information about network configurations, such as how to route packets to a particular IP address, by transmitting NHRP queries and replies between IP subnets. Thus, the functionality of an NHS 110 includes awareness of public next-hop devices for any given device.

A route server such as route server 112 is, generally, a device that runs one or more network layer routing protocols, maintains routing tables, and uses a route query protocol in order to provide network layer routing forwarding descriptions to clients. Thus, the functionality of a route server 112 in an IP telephony network includes resolving telephone numbers to private network addresses. In this context, a private network address is an address on a private network behind a firewall, gatekeeper, or other security/authorization device.

Generally, a virtual circuit 114 is a path between points in a network that appears to be a discrete, physical path but is actually a managed pool of circuit resources from which specific paths, channels or circuits are allocated as needed to meet traffic requirements. A switched virtual circuit is a virtual circuit in which a connection session is set up for a user only for the duration of a connection.

Detailed descriptions of the functionality of NHS 110, route server 112, and virtual circuit 114, with respect to embodiments of the approaches herein, are provided below.

Network environment 100 may also include an analog end device 106D connected to a PBX (Private Branch Exchange) 107, which is a private phone system switch that connects to the public telephone network and offers in-house connectivity. The PBX 107 is connected to the public network 108 via a T1 line 105 to one or more other devices, such as TDM (Time Division Multiplexing) device 109. TDM device 109 is connected to the public network 108. In such a scenario, the TDM device 109 would be publicly routable, that is, it is known by the network routing devices. Furthermore, end device 106D would not have a private IP address, hence, IP network communications would end at or near TDM device 109, typically with conversion of digital signals to analog signals.

FIG. 1 is not a comprehensive illustration of a network environment, but illustrates example network components that are useful in describing embodiments herein. For example, numerous other devices may be utilized to direct network traffic associated with communication between end devices 106A and 106B, such as registration servers, proxy servers, universal access servers, redirect servers, and the like.

Figure 2:
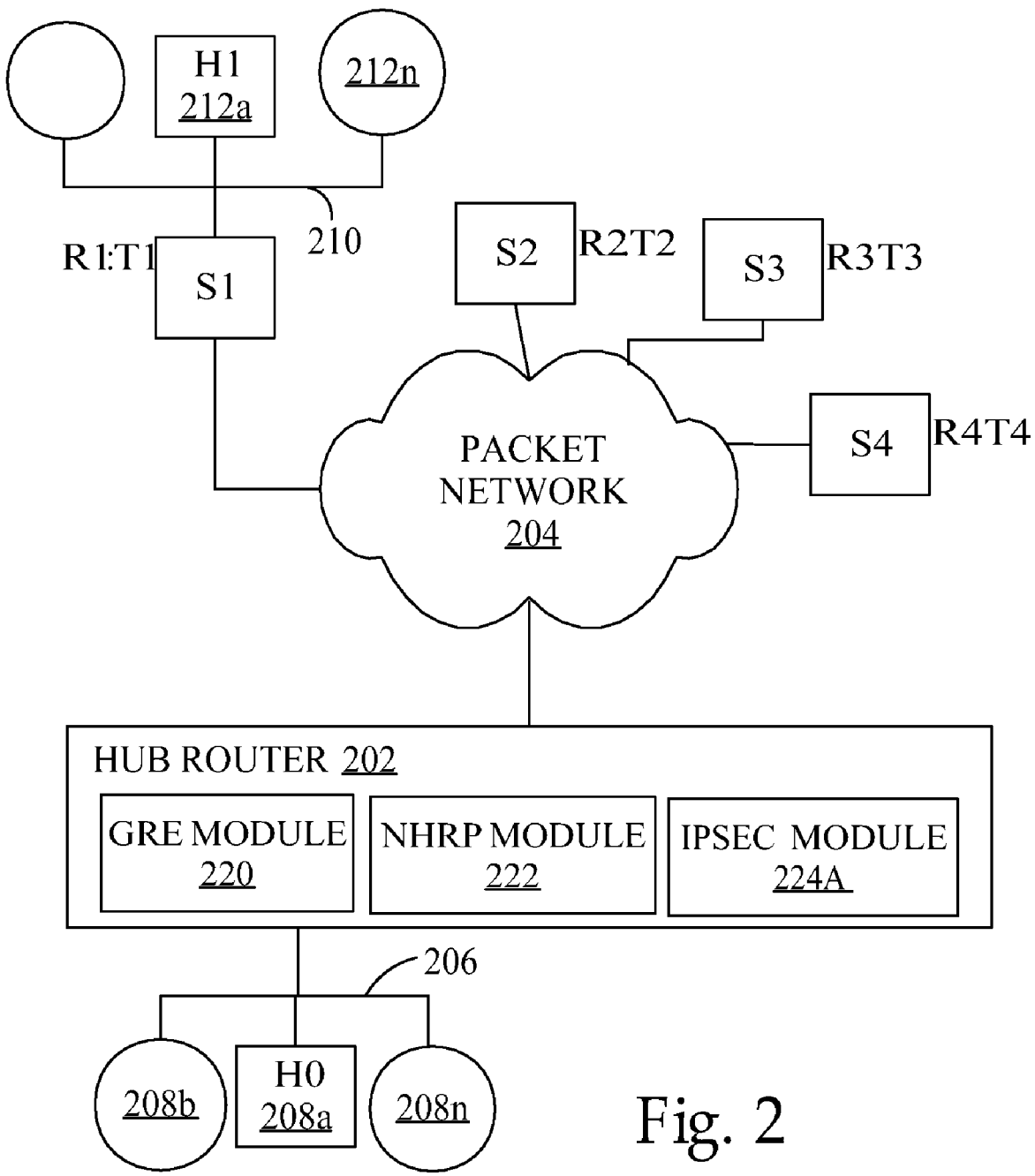
FIG. 2 is a block diagram of an example network in which a dynamic multipoint encrypted virtual private network may be established.

Operating Environment for Establishing a Dynamic Multipoint Encrypted Virtual Private Network FIG. 2 is a block diagram of an example network in which a dynamic multipoint encrypted virtual private network may be implemented. In FIG. 2, a router 202 is located in the position of hub for a hub-and-spoke arrangement of other routers S1, S2, S3, S4. Because of its logical role as a communications hub in such a system, in this description, router 202 is sometimes termed a hub; however, this terminology is distinct from a hardware hub as known in the networking field for interconnecting end stations, as in an Ethernet hub.

Hub router 202 is communicatively coupled to a packet-switched network 204 that may contain any number of network infrastructure elements including routers, switches, gateways, etc. Such elements are omitted from FIG. 2 for clarity, because they are not pertinent to the embodiments described herein. In one embodiment, network 204 is a TCP/IP network in which infrastructure elements execute a conventional routing protocol, such as RIP, EIGRP, OSPF, BGP, etc., for routing packets among the infrastructure elements. Hub router 202 also is communicatively coupled to a local area network 206 from and to which the hub router receives and routes data packets, respectively. LAN 206 comprises one or more hosts 208a, 208b, 208n. A first host 208a is also designated in this description as host H0.

The other routers S1, S2, S3, S4 also are communicatively coupled to network 204. Each of the other routers S1, S2, S3, S4 also may route data packets to a local area network, or to other network infrastructure elements. As an example, router S1 receives and routes from and to LAN 210 having hosts 212a, 212n. Host 212a is also referred to herein as host H1.

Further, each of the other routers S1, S2, S3, S4 is identified by a routable network address R1, R2, R3, R4, respectively. The designation "R" in R1, R2, R3, R4 is used to signify that such addresses are routable and "real," as opposed to virtual. Addresses R1, R2, R3, R4 are IP addresses, and may be dynamically assigned. For example, routers S1, S2, S3, S4 may communicate with address servers that conform to Dynamic Host Control Protocol (DHCP) and that assign a dynamic network address R1, R2, R3, R4 to the routers when they power-up or initialize. Although embodiments are described herein with reference to IP addresses and the IP protocol, implementations are not limited to use of IP. Rather, other packet-based protocols, even protocols that are not yet developed, are specifically contemplated.

Hub router 202 further comprises a GRE module 220, NHRP module 222, and IPsec module 224A. Each such module comprises one or more computer programs or other software elements for implementing the functions described further herein. Modules 220, 222, 224A may form components of an operating system for hub router 202. Each of the spoke routers S1, S2, S3, S4 are similarly configured with a GRE module 220, NHRP module 222, and IPsec module 224A.

For purposes of illustrating a clear example, limited numbers of routers, LANs, and hosts are shown in FIG. 2. However, in a practical embodiment, there may be any number of such elements, and the use of hundreds or thousands of routers is specifically contemplated.

The hub router 202 participates in a point-to-multipoint (i.e., "multipoint") Generic Routing Encapsulation (GRE) tunnel with routers S1, S2, S3, S4. A protocol for establishing GRE tunnels is described in IETF Request for Comments (RFC) 1701. Thus, in an embodiment, GRE module 220, which implements the functions and protocols of RFC 1701, is used to set up a multipoint GRE tunnel having one endpoint at a logical GRE interface in hub router 202, and multiple other endpoints at logical GRE interfaces of routers S1, S2, S3, S4. In this arrangement, the GRE tunnel interface at router 202 has a static virtual tunnel IP address of TH, and the GRE tunnel interfaces of routers S1, S2, S3, S4 have static virtual tunnel IP addresses of T1, T2, T3, T4, respectively, which are not conventionally routable over a public network. Use of a point-to-multipoint tunnel allows for a single tunnel interface on each router 202, S1, S2, S3, S4, rather than an interface for each point-to-point link in a point-to-point tunnel network. Hence, configuration information associated with and residing on each router is minimized. Furthermore, each tunnel interface can have any number of destinations configured or dynamically learned thereon.

Typically, tunnel addresses T1, T2, T3, T4, which are associated with routers S1, S2, S3, S4 of the virtual private network, are selected in an address range that places the addresses within the same subnet. Techniques are well-known in the art for assigning addresses to network devices such that they appear on the same subnet. Thus, the address TH of hub router 202 appears to be one hop away from address T1, even though multiple real infrastructure elements of network 204 may be interposed among the hub router 202 and endpoint router S1. The GRE tunnel may be established by providing appropriate GRE tunnel configuration commands to routers 202, S1, S2, S3, S4, which commands are interpreted by a configuration interpreter and executed by respective GRE modules 220.

NHRP module 222 of hub router 202 enables hub router 202 to resolve "non-routable" virtual tunnel addresses into real routable addresses so that infrastructure elements in network 204 can route packets to a tunnel endpoint. However, the real address of a tunnel endpoint may be assigned dynamically when an endpoint device initializes, with the exception of the hub router 202, which typically is configured with a static real address. Therefore, to facilitate such address resolution, upon power-up or initialization, routers S1, S2, S3, S4 register with hub router 202, which serves as a next hop server (NHS), and provide their real addresses and information about networks to which they can route packets. Such network information is typically provided by running a dynamic routing protocol over the VPN network. Hub router 202 stores the real addresses in a mapping of virtual tunnel addresses to real addresses, and stores the network information in a similar mapping, such as a routing table.

For example, assume that router S1 initializes and determines from its configuration information that NHRP is enabled thereon. In response, NHRP module 222 of router S1 sends an NHRP registration packet to hub router 202 that contains the real address R1 and tunnel virtual address T1 of S1. NHRP module 222 of hub router 202 stores R1 in a mapping that associates real address R1 to virtual tunnel address T1. Use of this arrangement enables hub router 202 to forward packets from one host to another host across a multipoint GRE ("mGRE") tunnel.

For example, assume that one host, such as H0, generates IP packets that are directed to host H1, and therefore have a source IP address value of H0 and a destination IP address value of H1. The packets arrive from LAN 206 at hub router 202. Hub router 202 looks up host H1 in a routing table and determines that host H1 is associated with a tunnel endpoint having virtual tunnel address T1.

Address T1 is a virtual address that is not routable by infrastructure elements in network 204, and therefore hub router 202 requests NHRP module 222 to resolve the virtual tunnel address. As a result, real routable address R1 is identified in association with virtual address T1. Hub router 202 encapsulates the packets from host H0 in a GRE header, and adds a new IP header having a source address of RH and a destination address of R1. Hub router 202 forwards the modified packet to network 204. The modified packet is structured as follows, with real source and destination IP addresses (RH and R1), a GRE header, and encapsulated IP host addresses (H0 and H1).

| IP S:RH D:R1 | GRE | IP S:H0 D:H1 |
| --- | --- | --- |

The packet is routed through network 204 to arrive at real address R1 of router S1, which detects the GRE header in the packet. Router S1 drops the new IP header (i.e., IP S:RH D:R1) and consults the encapsulated original IP header to identify the destination address (i.e., IP S:H0 D:H1) of H1. Router S1 then routes the packet to host H1 via LAN 210. Note that both hosts and host addresses are referred to similarly, as in host H1 has an associated address H1.

According to an embodiment, hub router 202 and the other routers S1, S2, S3, S4 can communicate encrypted data traffic on the multipoint GRE tunnel using the IPsec protocol by communicating certain messages and information among NHRP module 222 and IPsec module 124A.

Router Functional Components

Figure 3:
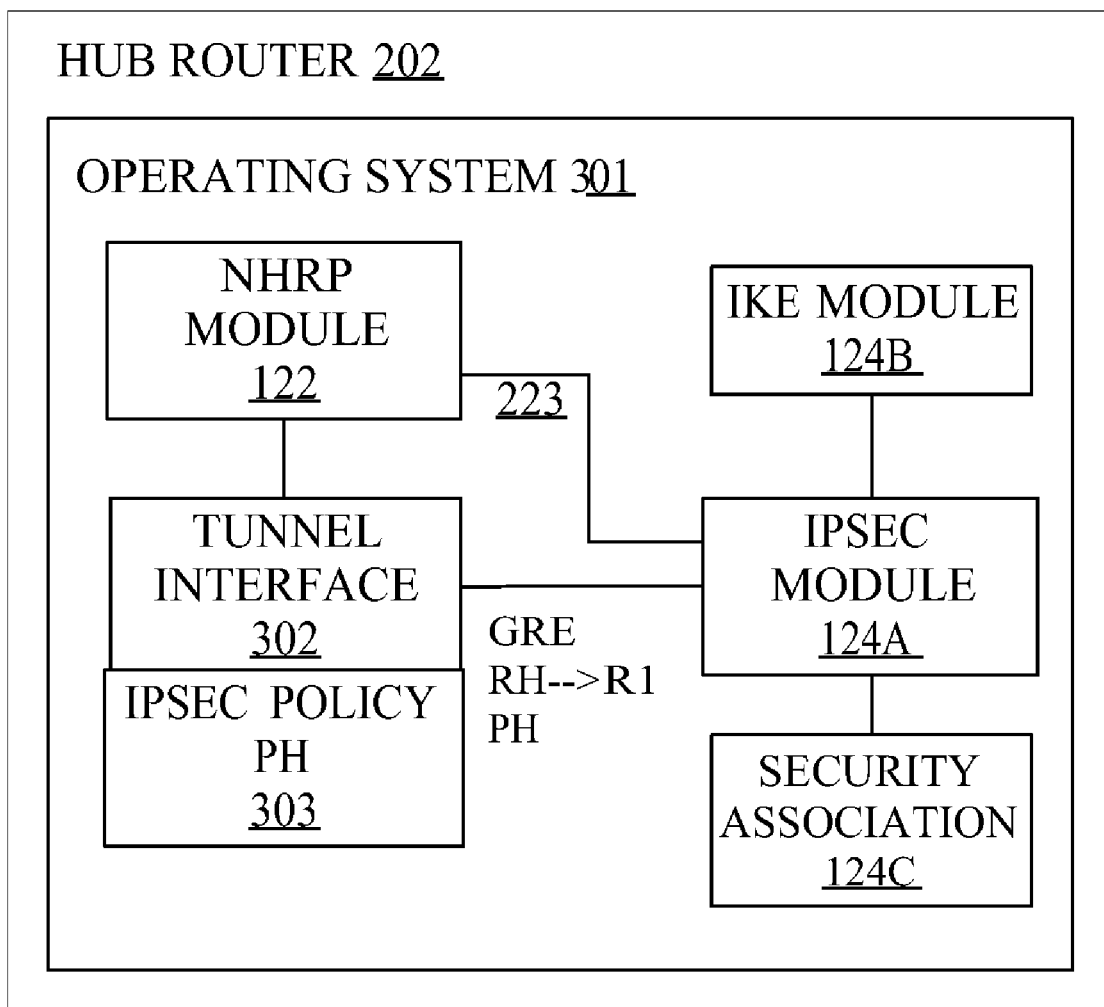
FIG. 3 is a block diagram of a hub router illustrating elements involved in communicating data on multipoint tunnels using IPsec encryption.

FIG. 3 is a block diagram of a hub router illustrating elements involved in communicating data on multipoint tunnels using IPsec encryption. Other routers configured with the hub router in a hub-and-spoke network architecture, for example, spoke routers S1, S2, S3, S4 (FIG. 2), are configured similarly to the hub router, as depicted in FIG. 3. However, in certain embodiments, the functionality of the hub and spoke routers is different. For example, in one embodiment, the hub router is designated as the next hop server for the spoke routers, thereby facilitating the resolution and mapping of associations between public and private network addresses. In that context, the hub router functions as a server and the spoke routers function as associated clients.

In the example of FIG. 3, hub router 202 executes an operating system 301 that includes NHRP module 222 and IPsec module 224A. Note that implementations are not limited to a configuration as depicted in FIG. 3. For example, NHRP module 222 and IPsec module 224A are not limited to being an operating system 301 function, but may be installed and configured separately from the operating system. NHRP module 222 and IPsec module 224A have a direct programmatic or messaging connection, as indicated by line 223. Using connection 223, as described below, NHRP module 222 can inform IPsec module 224A when mappings of virtual tunnel addresses to real addresses are created or deleted. Alternatively, in an embodiment, tunnel interface 302 can inform IPsec module 224A when address mappings are created or deleted. Operating system 301 also instantiates and manages, as a data structure or other logical construct, a tunnel interface 302 that represents an endpoint of a GRE tunnel having virtual address TH. In the course of operations and as depicted in FIG. 3, tunnel interface 302 communicates a message to IPsec module 224A that includes VPN tunnel information, real routable address information, and encryption policy information (e.g., GRE; RH:R1; PH, as depicted).

Further, IPsec module 224A is coupled to an Internet Key Exchange (IKE) module 224B. In the course of operations, as described further below, IPsec module 224A may create and manage one or more security associations with other end points, such as a security association 224C, for tunnel interface 302 associated with tunnel address TH and a tunnel interface at router S1 associated with tunnel address T1. In one embodiment, IPsec module 224A and IKE module 224B implement the functions and protocols described in IETF RFC 2401 to RFC 2411, inclusive.

Processes for Dynamically Establishing a Secure VPN

FIG. 4 is a flow diagram illustrating a high-level view of a process for establishing and using dynamic multipoint encrypted virtual private networks, according to an embodiment. For purposes of illustrating a clear example, the method of FIG. 4 is described with reference to FIG. 2 and FIG. 3. However, embodiments are not limited to the context of FIG. 2 and FIG. 3.

At block 402 a network security policy, such as an IPsec policy, is associated with a virtual private network tunnel interface at a first network device, such as hub router 202 or spoke router S1 of FIG. 2. In this context, "IPsec policy" refers to associated information, which may be encapsulated in an IPsec policy data structure, that specifies one or more encryption parameters and related metadata. For example, an IPsec policy may comprise values indicating that the encryption methodology is DES, IPsec transport mode is used, specific key lifetime values, etc. These values are typically established in a static configuration step as part of a router configuration. Each router may have a different IPsec policy for each of its interfaces. As an example, FIG. 3 illustrates IPsec policy PH 303, which is associated with tunnel interface 302. Thus, for example, block 402 involves associating information with tunnel interface 302 that instructs tunnel interface 302 to perform IPsec encryption using policy PH when GRE traffic is sent from the tunnel interface 302.

At block 404, input specifying a new association of a VPN endpoint address to a corresponding real routable address of a second network device, such as spoke router S1 or S2, is received. In one embodiment, such input is received at tunnel interface 302 (FIG. 3) when NHRP module 222 (FIG. 2) generates a new mapping of a GRE tunnel address for a destination spoke router, such as T2, to a corresponding real routable address R2 for the destination spoke router. Such input may be received either at a spoke router or a hub router. Further, the input may be transmitted and received in response to a spoke router sending a resolution request message to the hub router acting as next-hop server (NHS), in the form of a resolution reply message. This activity may occur, for example, when one spoke router, such as router S1, wants to communicate with another spoke router, such as router S2. Alternatively, such input may occur when a hub router, such as hub router 202 (FIG. 2), receives a registration request from a spoke router, such as router S1, and consequently performs an address resolution and generates an address mapping. For example, this activity may occur upon initialization activity as part of a power up sequence for the spoke router.

An mGRE tunnel between a given spoke router and the hub router can be established upon power-up of the spoke router, so that subsequent NHRP resolution traffic is IPsec encrypted. For example, router S1 is aware of its real address R1 and the static hub real address RH. Thus, upon power-up and establishment of the VPN tunnel interface on S1, a IPsec module 224A listener socket at S1 is created, S1 registers with the hub router 202 (FIG. 2) as NHS, thus triggering a T1:R1 mapping and reception thereof at S1. Consequently, an IPsec state between S1 and hub router 202 is established, as described further below. Hence, subsequent network traffic transmitted between S1 and the hub router 202, including NHRP registration and/or resolution messages, are protected through IPsec encryption.

The real IP address of spoke router S1 is sent to hub router 202 in NHRP registration packets, which is used to create the T1:R1 mapping for S1. Consequently, spoke routers' real addresses can dynamically change (e.g., due to a reboot or reconnect to the network), and a new address mapping and IPsec state will automatically be generated. Further, once hub router 202 (FIG. 2) receives a NHRP registration from a given spoke router, the hub router 202 enters unicast and multicast NHRP mappings for the given spoke router. The unicast mapping is used when sending IP unicast packets over the VPN tunnel and the multicast mapping is used when sending multicast packets over the tunnel, most notably for the dynamic routing protocol packets (e.g., RIP, EIGRP or OSPF).

This process is repeated as each spoke router powers up. Thus, the hub-and-spoke part of the VPN network, although built dynamically, will stay up all the time since the network paths are used for propagation of dynamic routing information from spoke routers S1, S2, S3, S4 to the hub router 202 (FIG. 2) and back out to spoke routers.

Typically, for hub routers, there is a block of configuration code that defines the crypto map characteristics for each spoke router. The characteristics code includes "set peer . . . " commands for each peer router. In an embodiment in which IPsec is running in transport mode, IPsec peer addresses must match the IP destination address on each packet to be encrypted, which is the GRE tunnel address. Thus, for example, for purposes of negotiating a security association, the IPsec module 224A (FIG. 2) can obtain the appropriate peer address from the GRE tunnel interface or NHRP rather than requiring specification in the configuration code. Consequently, the number of lines of configuration code on a hub router is significantly reduced, in relation to prior approaches. This approach also reduces the configuration on a spoke router, but to a lesser degree.

The above dynamic hub-and-spoke network facilitates the dynamic creation of direct dynamic spoke-to-spoke tunnels. This allows for the forwarding of spoke-to-spoke data packets directly between spokes without having to manually setup a full-mesh VPN network. For an example, assume that the embodiment of FIG. 4 is used when a first spoke router S1 ("spoke1") is dynamically establishing a direct encrypted mGRE tunnel to a second spoke router S2 ("spoke2"). Assume also that there is traffic destined from host H1 behind S1 to host H2 behind S2. S1 knows, possibly from a dynamic routing protocol, that to route to S2 it is supposed to send packets to VPN tunnel address T2, but S1 does not have an NHRP mapping for T2. That is, S1 does not know the real routable address R2 of S2, only the VPN tunnel address T2. Therefore, it sends an NHRP resolution request to its NHS. As described above, hub router 202 may function as the NHS. Regardless, upon S1 receiving the NHRP resolution reply from its associated NHS, S1 will create an internal NHRP mapping for

<T2>==><R2>;

that is, a T2:R2 mapping.

The creation of the NHRP mapping for T2 will trigger IPsec module 224A of S1 to set up state with S2. Specifically, in response to the input received at block 404, at block 406 the tunnel interface 302 (FIG. 3) of source router S1 sends a message to its associated IPsec module 224A (FIG. 2), requesting it to generate new encryption state information with destination router S2, as depicted at block 408. In the message, the tunnel interface 302 also provides at least the real IP addresses of the tunnel endpoints, such as R1 and R2, and the IPsec policy, such as policy PI similar to policy PH on hub router 202.

At block 408, new encryption state information is generated for use in encrypting traffic directed from the first or source network device, such as spoke router S1, to the second or destination network device, such as spoke router S2. The encryption state is represented as a data structure or other logical construct, which specifies parameters used to encrypt and transmit packets between the tunnel endpoints. The encryption state information includes, for example, routable network address information, VPN encapsulation protocol (e.g., GRE) information, and security policy information. In one embodiment, block 408 is triggered when a listener socket connection of IPsec module 224A (FIG. 2) for a given router receives the foregoing message of block 406 from its associated tunnel interface 302 (FIG. 3). Further, the IPsec module 224A listener socket for a given router may be automatically created upon initialization of the tunnel interface 302 for that router.

Block 410 is described for an embodiment in which IPsec is used to secure a GRE or other VPN tunnel. A similar step, with respect to secure association establishment and key exchange, could be performed utilizing appropriate protocols in implementations that do not use the IPsec protocol.

At block 410, IPsec module 224A (FIG. 2) of the source router S1 initiates a communication with the destination spoke router S2, utilizing an appropriate protocol such as ISAKMP (Internet Security Association and Key Management Protocol) to perform a key exchange such as IKE. As a result, the source spoke router authenticates itself to the destination spoke router, exchanges encryption key information and negotiates encryption parameters. As a result of block 410, pairwise keys are generated for use in encrypting traffic among the pertinent spoke routers S1, S2.

At this point in the process, the source router S1 can transmit encrypted IP packets encapsulated in a GRE tunnel directly to the destination router S2. Upon receiving the first packet from S1 at S2, S2 initiates a similar process with respect to address resolution for S1, so that it knows to where a return packet should be transmitted. Further, an encryption state associated with the two spoke routers has already been established, therefore return data packets to the source spoke router can be encapsulated and encrypted from the destination spoke router to the source spoke router. Due to the ability to dynamically build spoke-to-spoke links, load on an associated hub router, as well as network latency, is reduced.

If the networks change on either side of the encrypted VPN tunnel, the other side will dynamically learn of the change through NHRP registration and mapping propagation and through propagation of dynamic routing information. Thus, encrypted connectivity will be established without any router configuration changes.

The procedure described with respect to blocks 402-410 may also be used when the originating or source node is a hub router and the destination node is a spoke router.

Assume, for purposes of illustrating an example with reference to FIG. 4, that an IPsec policy PH is created for use when GRE traffic is routed from hub router 202 (FIG. 2) at real address RH to router S1 at real address R1. Whether initiated by a spoke-to-spoke communication or a hub-to-spoke communication, at block 412 an IPsec security association ("SA") is stored. In one embodiment, the security association is passed from IPsec module 224A to tunnel interface 302. The SA associates policy PH with traffic-identifying information. Thus, for example, an SA 224C may indicate that policy PH is used when traffic has a source address of RH, a destination address of R1, and a protocol of GRE. The SA also typically includes the keys that were generated at block 410 and a security parameter index (SPI) value, which is used as an identifier.

At block 414, encrypted traffic is passed on the VPN tunnel from the first device to the second device, based on the encryption state generated at block 408. For example, when tunnel interface 302 (FIG. 3) of hub router 202 receives data packets for forwarding on the tunnel to spoke router S1 (e.g., a packet from H0 destined to H1), the tunnel interface 302 invokes the associated IPsec module 224A (FIG. 2), which determines that security association 224C (FIG. 3) specifies how to encrypt the traffic. In turn, IPsec module 224A encrypts the traffic according to the SA 224C, and passes the packets to the real interface RH of the hub router 202 (FIG. 2) out through the tunnel to the real address R1 of destination router S1, whereby it is routed to the final destination H1.

The process described dynamically establishes a secure VPN by generating an encryption state for network traffic over a VPN link in response to notification of a virtual address-to-real address mapping. It is further dynamic with respect to spoke-to-spoke VPN links, in that network traffic between two spokes can trigger generation of an encryption state and a security association among the two spokes, via NHRP resolution requests and replies between spoke routers and their associated NHS. Therefore, significantly, a statically configured full mesh network is unnecessary. Note that hub-to-spoke links are normally more lasting than spoke-to-spoke links due to the repetitive dynamic routing protocol traffic and NHRP registration and resolution traffic between a hub router and its related spoke routers.

An encrypted packet, according to the techniques described herein, is structured as follows, with real source and destination IP addresses (RH and R1), a conventional transport mode IPsec ESP (Encapsulating Security Payload) header, a GRE header, and encapsulated IP host addresses (H0 and H1).

| IP S:RH D:R1 | ESP | GRE | IP S:H0 D:H1 |
|---|---|---|---|

IPsec does not readily support IP multicast traffic. Further, dynamic routing protocols typically use IP multicast traffic to communicate among network devices for dynamic routing purposes. Significantly, utilizing the techniques described herein, an IP multicast packet can be encapsulated into an IP unicast GRE packet, which can be encrypted using IPsec. Thus, the capability is provided for using IPsec with multicast traffic and, therefore, for using dynamic routing protocols. Consequently, dynamic discovery of network destinations over a VPN is facilitated.

Furthermore, in an implementation that utilizes a dynamic routing protocol, when the hub router 202 (FIG. 2) reflects routes advertised from one spoke router out to the other spoke routers, the hub router 202 may set the next-hop for such routes to another spoke router. That is, the hub uses the originating spoke router rather than itself as the next-hop for the route. Thus, spoke routers can route traffic directly to another spoke router rather than through the hub router.

In an alternative embodiment, an IPsec interface configured in IPsec tunnel mode is used in addition to encapsulation of a GRE tunnel. Thus, IPsec is used to implement both encryption and encapsulation functionality. This is useful, for example, when there are network modules in packet network 204 (FIG. 2) that will do Network Address Translation (NAT) of the IP header of the IPsec packets, which could break the IPsec transport mode tunnel and thus break the VPN network.

In an alternative approach, IPsec-related operations (steps 408-414 of FIG. 4) may be triggered by initialization of the mGRE interface of a spoke router, such as router S1, rather than upon reception of an address mapping. For example, assume that a spoke router is powered up. On the spoke router, in its VPN tunnel configuration, are the CLI commands:

ip nhrp map <TH><RH>
ip nhrp nhs <TH>

The spoke router configuration is parsed, and the first command above causes creation of a static NHRP mapping entry of the hub tunnel address to the hub real routable address, at the spoke router. When the NHRP mapping entry is created, the IPsec module 224A (FIG. 2) of the spoke router S1 is triggered to create an IPsec state with the hub router 202.

The second command above instructs the NHRP module 222 (FIG. 2) of the spoke router that the hub router 202 (FIG. 2) is its next-hop-server. This instruction causes NHRP module 222 of the spoke router to send NHRP registration packets to the hub router 202, as the NHS. This will use the NHRP mapping entry above to actually send the tunnel packet to the router (hub) associated with RH.

Hence, in this approach, initiation of IPsec operations may occur when a configuration interpreter executes a configuration command at a spoke router, which sets an NHRP mapping for the hub router and sets the hub as the NHS for the spoke. Consequently, NHRP is not used as a signaling protocol to aid in establishment of a VPN tunnel. Contrastly, NHRP is used for network address resolution, which predominately occurs within a VPN tunnel (e.g., a GRE tunnel) that is already established, and subsequently, as a trigger mechanism for IPsec state generation for traffic through the tunnel. Hence, NHRP resolution traffic can be exchanged through the tunnel rather than in the clear.

In yet another alternative approach, steps 404 to 414 of FIG. 4 may be performed in an embodiment that operates with a point-to-point tunnel in which NHRP is not used. In this alternative, a peer router is manually configured on the tunnel interface of a given router. For example, router S2 is manually configured with VPN tunnel address information associated with router S1. In response, the tunnel interface 302 (FIG. 3) at router S2 creates a message based on information known to it from its router configuration, such as its real IP address R2, the peer router real IP address R1, IPsec policy, etc. The tunnel interface 302 at router S2 sends the message to its associated IPsec module 224A (FIG. 2). The IPsec module 224A receives this message and creates the encryption state information with respect to the peer router, in a manner as described above in reference to block 408.

Although certain embodiments have been illustrated in the context of IPsec encryption, the invention is not limited to that context. Further, mechanisms other than NHRP alone may be used to resolve addresses of remote routers. For example, Tunnel Endpoint Detection ("TED") protocol may be used in combination with NHRP module 222 (FIG. 2) and multipoint GRE tunnels as described herein in order to obtain one or more remote router addresses, and to communicate such addresses to IPsec module 224A (FIG. 2).

Embodiments herein provide for enhanced scalability in full mesh or partial mesh IPsec VPNs. Embodiments are especially useful when spoke-to-spoke traffic is sporadic (i.e., every spoke is not constantly sending data to every other spoke), such as in a VoIP (Voice Over Internet Protocol) context. Any spoke may send data directly to any other spoke, as long there is direct IP connectivity between the spokes.

In prior approaches to full mesh networks, all point-to-point IPsec (or IPsec+GRE) tunnels must be configured on all the routers in the mesh network, even if some or most of these tunnels are not running or needed at all times. Utilizing an embodiment described herein, one router is designated the "hub", and all the other routers ("spokes") are configured with tunnels to the hub. The spoke-to-hub tunnels are up continuously. However, the spoke routers do not have nor need configuration for tunnels to any of the other spoke routers. Instead, when a spoke router wants to transmit a packet to the subnet behind another spoke router, it uses NHRP to dynamically determine the required destination address of the target router. The hub router acts as the NHRP server and handles this request for the source router. The two spokes then dynamically create an IPsec tunnel between them (via the single mGRE interface) and data can be directly transferred.

An idle or other timeout function will automatically tear down the encrypted VPN tunnel after a period of inactivity. In an embodiment, the timeout function is triggered by an NHRP mapping timeout, wherein the tunnel interface becomes aware of the NHRP timeout and notifies the IPsec module, which in turn deletes its state information/data structure relative to the particular tunnel.

Furthermore, multiple hub routers can be implemented in the network, each supporting a large number of spokes. The hubs in this "partial temporal mesh" could be interconnected using a mesh of permanent GRE+IPsec tunnels, local LAN interfaces (if the hubs are co-located), or these hubs could serve as spokes for another tier of hub routers to create a multiple tier hub-and-spoke VPN network.

Embodiments herein support IPsec nodes with dynamically assigned addresses (e.g. Cable, ISDN, DSL). This applies to hub-and-spoke as well as mesh networks. Consequently, the cost of provisioning spoke routers to an underlying network is reduced due to the lower costs associated with dynamic addresses than with static addresses.

Embodiments herein simplify the addition of VPN nodes. When adding a new spoke router, only the spoke router is configured and plugged into the network, and possibly ISAKMP authorization information for the new spoke is added at the hub router. The hub router will dynamically learn about the new spoke router and the dynamic routing protocol will propagate routing paths to the hub and all other spokes.

Embodiments herein significantly reduce the size of the configuration needed on all the routers in the VPN. This is also the case for GRE+IPsec hub-and-spoke only VPN networks.

Embodiments herein support IP multicast and dynamic routing traffic across the VPN through utilization of GRE, which encapsulates the IP multicast packets into IP unicast tunnel packets. Hence, a dynamic routing protocol can be used, and redundant "hubs" can be supported by the protocol. Multicast applications are also supported.

Embodiments herein support split tunneling at the spokes. Furthermore, Embodiments herein support CEF (Cisco's Express Forwarding) and other fast switching techniques. The mGRE/NHRP solution can CEF switch the mGRE traffic, resulting in much better performance than with typical process switching in mGRE interfaces.

Process for Dynamically Securing Delay-Sensitive Network Traffic

Figure 5:
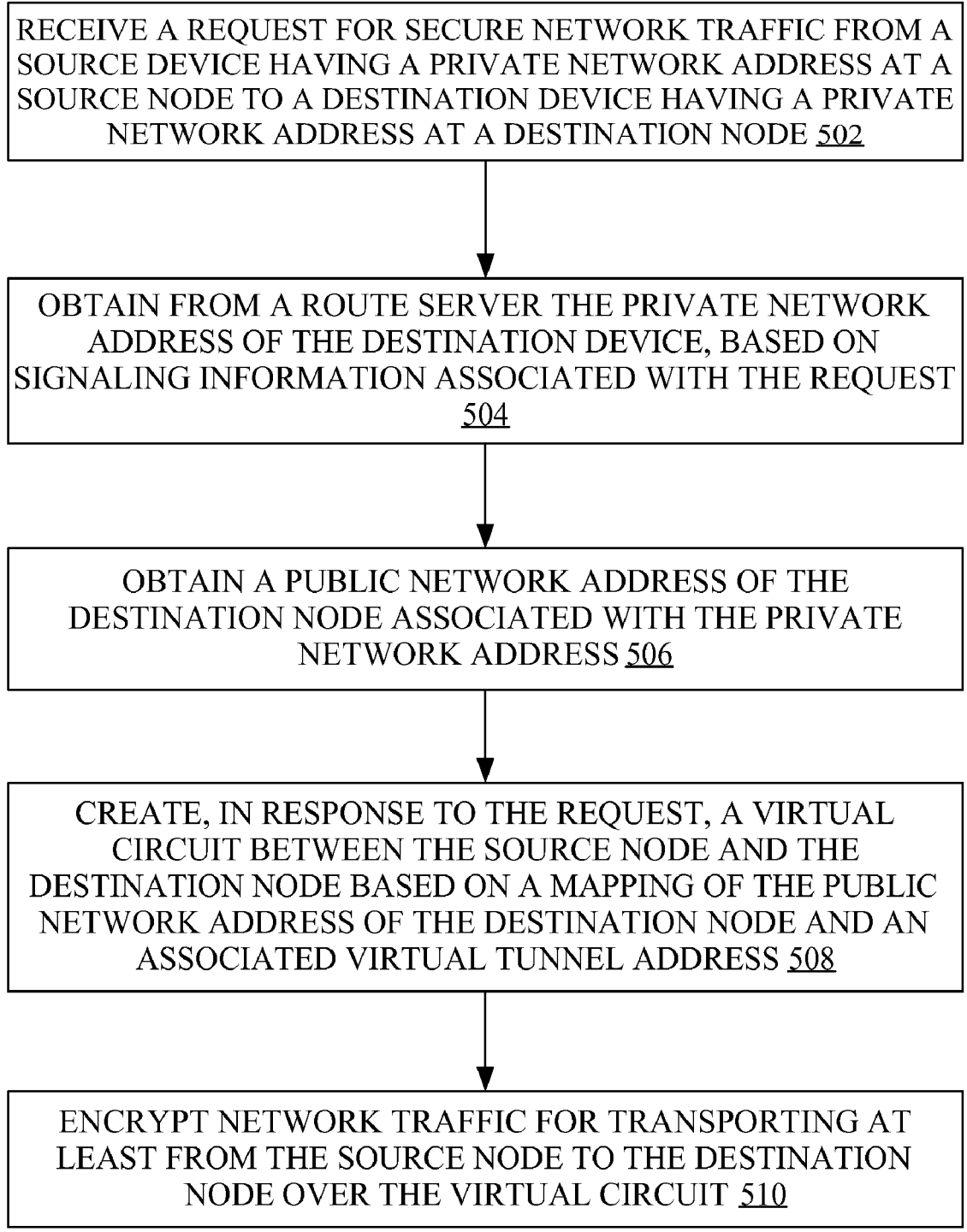
FIG. 5 is a flowchart illustrating a process for dynamically securing delay-sensitive network traffic.

FIG. 5 is a flowchart illustrating a process for dynamically securing delay-sensitive network traffic. For purposes of illustrating a clear example, some of the components of FIG. 1 are referred to in describing the processes of FIG. 5. However, the invention is not limited to the implementations in these examples.

At block 502, a request is received for secure network traffic. The request is received from a source device having a private network address at a source node and is directed to a destination device having a private network address at a destination node. For example, a request from an end device 106A, such as an IP phone on a private LAN 104A, is received at router 102A, requesting secure voice communication with an end device 106B, such as a voice-enabled PDA on a private LAN 104B, through a public network 108 such as the Internet. Typically, a user at end device 106A would perform conventional dialing of an IP phone, thus transmitting data that represents the telephone number associated with the end device 106B to the router 102A. Additionally, a user at end device 106D could dial a conventional analog phone, transmitting DTMF (Dual Tone Multi-Frequency) signals that represent a telephone number to the TDM device 109, through PBX 107 and T1 line 105.

At block 504, the private network address of the destination device is obtained from a route server or gatekeeper, based on signaling information associated with the request of block 502. For example, router 102A communicates with route server 112 according to a particular signaling protocol, thereby exchanging protocol-specific signaling information that includes a representation of the end device 106B telephone number. A request/response transaction may be performed to obtain the signaling information. Any suitable signaling and/or transport protocol associated with particular media types may be used with the invention, such as H.323, SIP, RTP, Q.931, and their respective associated protocols. Examples of media types include voice and video. The responsibility for understanding the specific transport protocol lies with the route server 112, or with some other network device that can convert the source protocol to a protocol understood by the route server 112 in cases in which the router 102A and the route server 112 do not support the same protocols.

In the public Internet, a packet cannot be routed to a private network address entirely through the public network. That is, conventional routers only route to public IP addresses. Therefore, a route server 112 is used to resolve the requested telephone number of the destination end device 106B, received via router 102A, to a private network address for the destination end device 106B associated with the telephone number. The route server 112 identifies and returns the private network address back to a requesting client, such as router 102A.

Once the private network address of the destination end device 106B is known, the router 102A needs to know how to reach that private network address, or at least how to get as close to the private network address as possible via the public network 108 (i.e., to the destination node). Therefore, at block 506 a public network address of the destination node that is associated with the private network address obtained in block 504 is obtained. In this context, "destination node" refers to the node of the public network 108 that interfaces with the private network 104A, 104B, 104C, respectively. For example, router 102B is the interfacing device between the public network 108 and the private network 104B.

In one embodiment, the public network address of the destination node is obtained from a next-hop server, such as NHS 110. Many network devices register with a next-hop server upon initialization, and next-hop servers are capable of exchanging information with other next-hop servers. Thus, NHS 110 has information about every site in the public network, and is a source of the information that router 102A uses to facilitate provisioning of secure delay-sensitive network traffic (e.g., voice) over public network 108. As described above, a router configured as a hub router in a hub-and-spoke network, such as hub router 202 (FIG. 2) can be configured as NHS 110, and can, therefore, provide a virtual address to real address mapping. Further, this mapping triggers creation of an encryption state for network traffic between the source and destination nodes, as depicted at block 408 of FIG. 4.

Alternatively, public address information may be obtained from a device other than NHS 110, using protocols other than NHRP, for example, the TED protocol. Furthermore, other devices may contribute to determining a route between router 102A and router 102B on which a tunnel through the public network 108 is established. As a non-limiting example, a GLP (Gateway Location Protocol)-enabled gateway and/or a directory server may be used.

In one implementation, a public address corresponding to the private address of a destination node is obtained from the NonstandardData fields in multimedia call setup signaling. For example, the H.225 Recommendation ("Call Signaling Protocols and Media Stream Packetization for Packet-Based Multimedia Communication Systems"; dated Nov. 2000; section 7.11.2) from the ITU-T refers to the capability of carrying public IP addresses in a nonStandardData field of a "confirm" signal (ACF), where the destCallSignalAddress field carries the original private IP address of the endpoint. H.225 messages are exchanged between endpoints if there is no gatekeeper; however, if there is a gatekeeper, the H.225 messages are exchanged either directly between endpoints or between the endpoints after being routed through a gatekeeper or other call control server, such as a with gatekeeper-routed call signaling, a SIP proxy, or a MGCP (Media Gateway Control Protocol) CallAgent.

Implementation goals include minimizing the overhead from call/tunnel set-up processing. Therefore, in another embodiment, the public network address of the destination node is obtained from a cache at the source node that stores mappings of private network addresses to public network addresses. For example, the router 102A may cache IP address information to limit its communications with the NHS 110. Thus, the relevant public address information may already be available locally to the router 102A, without requiring communication with the NHS 110 in response to every request (e.g., for a commonly called number, or a commonly requested end device). For another example, the cache may be populated through the public-to-private address mapping acquired from the multimedia signaling, as described above in reference to the H.225 call signaling protocol. Accordingly, in this approach, block 506 involves searching a cache for a public network address.

At block 508, in response to the request for secure network traffic of block 502, a virtual circuit is created between the source node and the destination node, based on a mapping of the public network address of the destination node that is obtained at block 506 and an associated virtual tunnel address of the destination node. For example, a bi-directional tunnel is created through public network 108 between source router 102A and destination router 102B, as depicted as tunnel 114 of FIG. 1 and as described in reference to FIGS. 2-4. Since the virtual circuit, or tunnel 114, is created in response to the request, the virtual circuit is dynamically created.

In one embodiment, the tunnel 114 is a dynamic GRE tunnel. GRE protocol is used for encapsulation of an arbitrary network layer protocol over another arbitrary network layer protocol, and is described in IETF RFC 2784. In the most general case, a system that has a packet that needs to be encapsulated and delivered to some destination (a payload packet) is first encapsulated as a GRE packet. The resulting GRE packet can then be encapsulated as some other protocol (delivery protocol) packet and then forwarded to its destination via a GRE "tunnel" or virtual circuit.

In one implementation, a point-to-multipoint GRE communication link is created and maintained as part of the process for securing delay-sensitive network traffic. For example, a mGRE tunnel is originated at router 102A to communicate with the NHS 110. In this scenario, the same mechanism is used at block 508 to create a virtual circuit or tunnel 114 between router 102A and router 102B. Thus, use of a point-to-multipoint mechanism minimizes the amount of provisioning needed to create the tunnel 114 and other similar tunnels originating at the same source node. Furthermore, redundant provisioning is eliminated.

At block 510, network traffic is encrypted for transport at least from the source node to the destination node over the virtual circuit. In one embodiment, the packets representing a voice call are encrypted using IPsec protocol, using either transport or tunnel modes, depicted as blocks 406-412 of FIG. 4 and described in reference thereto. Another example of a secured transport protocol that can be implemented is SRTP (Secure Real-Time Transport Protocol). However, the invention is not limited to use of the IPsec or SRTP protocols.

For full bi-directional encrypted communication, both the source and destination nodes are provided with both encryption and decryption capabilities. For example, both source and destination routers support IPsec.

In one embodiment, an optional step to the process illustrated in FIG. 5 is to ensure the integrity of the network traffic transported from the source node to the destination node over the virtual circuit. In another embodiment, an optional step is to ensure the authenticity of the network traffic transported from the source node to the destination node over the virtual circuit. The preceding optional steps can be implemented into the process either alone or in combination. Using IPsec for encryption of the network traffic is one, but not the only, technique for implementing the preceding optional steps.

In tunnel mode of IPsec, the entire original IP packet is encrypted and it becomes the payload, i.e., is encapsulated, in a new IP packet. Hence, in one embodiment, encrypting network traffic for transporting over the virtual circuit at block 510 comprises: (1) encapsulating an encrypted payload packet of the network traffic in an encapsulating protocol packet; and (2) encapsulating the encapsulating protocol packet in a delivery protocol packet. For example, router 102A receives a request for secure voice communication between end device 106A and end device 106B. After performing steps 502-506 of FIG. 5, steps 508 and 510 can be performed generally as indicated by steps (1) and (2) above (and as described in more detail in reference to blocks 406-412 of FIG. 4). That is, using IPsec, the original payload RTP packet is encrypted, keys established and exchanged, and headers added (ESP header and possibly an AH header), thereby generating an encrypted IPsec-encapsulated RTP voice packet. Then, using GRE, a GRE header is added to the encrypted IPsec-encapsulated RTP packet and the resulting packet is encapsulated in a delivery protocol packet (e.g., IPv4), thereby generating an encrypted, twice-encapsulated RTP voice packet.

Another process is provided for dynamically securing delay-sensitive network traffic that is directed to an end device 106D behind a PBX 107 or similar device, in which the end device does not have an associated IP address. According to this embodiment, a request is received for secure network traffic between a source device at a source node and a destination device at a destination node. A public network address for the destination node is obtained from a next-hop server, and, in response to the request, a virtual circuit is created between the source and destination nodes based on a mapping of the public destination address to an associated virtual tunnel address. Network traffic is then encrypted for transporting at least from the source node to the destination node, and the PBX 107 at the destination node is responsible for forwarding (i.e., switching) the traffic to the end device 106D. This process is applicable if one or both of the participating end devices do not have a private IP or other packet-switched network address.

Process for Tearing Down Secure Virtual Circuit

Figure 6:
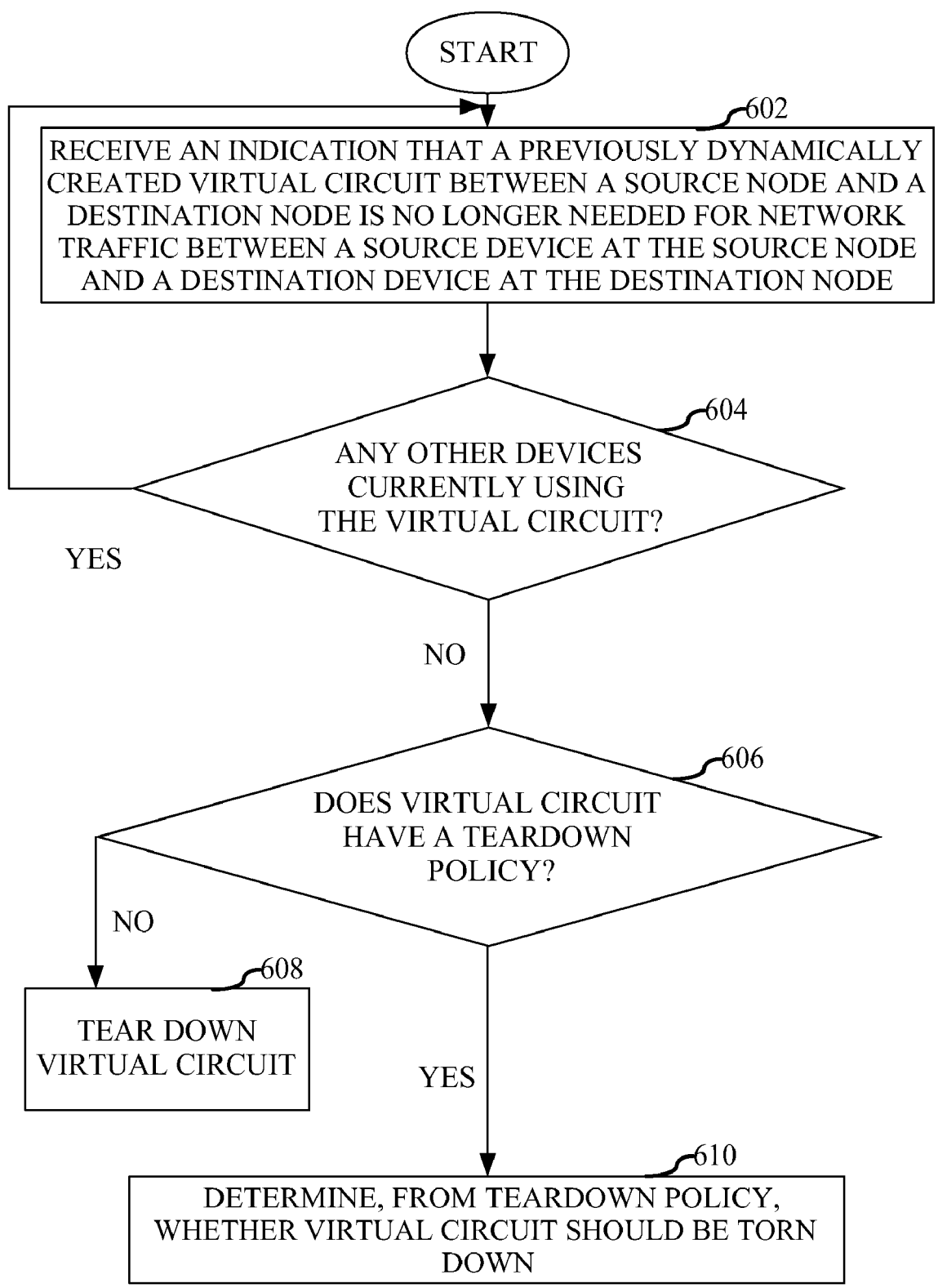
FIG. 6 is a flowchart illustrating a process for tearing down a secure virtual circuit.

FIG. 6 is a flowchart illustrating a process for tearing down a secure dynamically created virtual circuit. At block 602, an indication is received that a virtual circuit between a source node and a destination node is no longer needed for secure network traffic between a source device at the source node and a destination device at the destination node. For example, an IP phone in the position of end device 106A is hung up, and router 102A receives this indication that telephone communication with end device 106B over virtual circuit 114 is finished. The virtual circuit is a dynamically created virtual circuit that was previously created using the process illustrated in FIG. 5.

At decision block 604, it is determined whether any other devices are currently using the virtual circuit. For example, router 102A determines whether any network traffic other than that between particular end devices 106A, 106B is currently using virtual circuit 114 between the two network nodes. If any other devices are still using the virtual circuit, then the process returns to wait for the other network traffic to end, and to receive such indications, such as at block 602.

If the determination at block 604 is negative, then at decision block 606 it is determined whether the virtual circuit has an associated teardown policy. For example, router 102A may access stored configuration information at the router to determine whether to tear down the virtual circuit. If the virtual circuit has no teardown policy, then the virtual circuit is torn down at block 608. In one embodiment which utilizes cache at router 102A to store, among other things, the public network address information used to create the virtual circuit 114 between 102A and 102B, tearing down the virtual circuit 114 is performed by clearing the cached information from the cache of the participating routers 102A, 102B.

If the determination at block 606 is positive, then at block 610 it is determined, from the applicable teardown policy, whether the virtual circuit should be torn down. A teardown policy may indicate, for example, that all virtual circuits are kept up for 24 hours minimum. A teardown policy may consider, for example without limitation, the amount of network traffic using the given virtual circuit. Such a policy consideration may consider the frequency of calls or other network traffic over the virtual circuit, as well as the duration of such traffic. In general, creating a virtual circuit results in some processing overhead, but maintaining or tearing down the virtual circuit is relatively simple and computationally inexpensive. Hence, in some instances, it is a more efficient use of resources to maintain a virtual circuit with no current traffic over it rather than to automatically tear it down when traffic ends, only to recreate another virtual circuit upon a subsequent request for secure network traffic. Thus, the processing and network traffic overhead associated with virtual circuit creation and teardown is minimized.

Implementation Mechanisms—Hardware Overview

Figure 7:
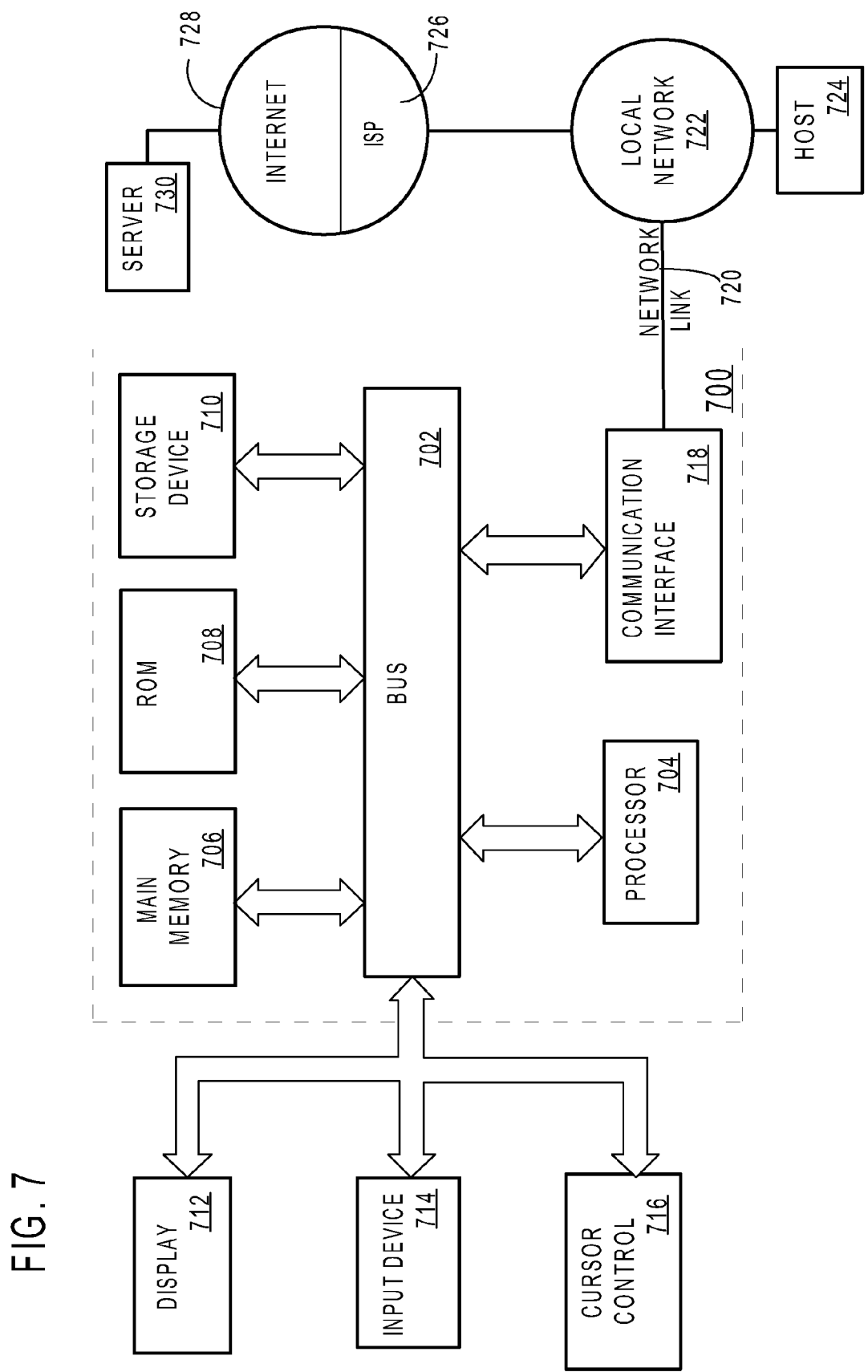
FIG. 7 is a block diagram that illustrates a computer system upon which an embodiment may be implemented.

FIG. 7 is a block diagram that illustrates a computer system 700 upon which an embodiment of the invention may be implemented. Embodiments are implemented using one or more computer programs running on a network element such as a router device. Thus, in this embodiment, the computer system 700 is a router.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-722 interface. An external terminal 712 or other computer system connects to the computer system 700 and provides commands to it using the interface 714. Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements may include a local network 722 coupled to one or more hosts 724, or a global network such as Internet 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface 719. The destinations may include host 724, server 730, other end stations, or other routing and switching devices in local network 722 or Internet 728.

The invention is related to the use of computer system 700 for dynamically securing delay-sensitive network traffic. According to one embodiment of the invention, a multipoint IPsec VPN is established by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for dynamically securing delay-sensitive network traffic as described herein.

The received code may be executed by processor 704 as it is received, and/or stored in storage device 710, or other non-volatile storage for later execution. In this manner, computer system 700 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

With respect to dynamically securing video traffic over a network using the techniques described herein, an extension to the invention includes ensuring that the end devices (e.g., end devices 102A, B) are capable of applying QoS (Quality of Service) processes to the secure network traffic over the virtual circuit 114. One example of QoS support includes the capability of fragmenting video traffic (in general, due to the size of some video frames), possibly in conjunction with prioritizing voice traffic over video traffic. The foregoing is but one example of possible QoS policies that may be implemented with the techniques described herein.

What is claimed is:

1. A method for dynamically securing delay-sensitive network traffic, comprising the computer-implemented steps of:
receiving a request for secure network traffic between a source device at a source node and a destination device at a destination node;
obtaining from a virtual-next-hop server a public network address for the destination node;
wherein the virtual-next-hop server is a physical next-hop to the destination node and a virtual next-hop from the source node;
wherein the virtual-next-hop server is identified by its virtual tunnel IP address, which is not a public network address for the virtual-next-hop server;
creating, in response to the request, a virtual circuit between the source node and the destination node based on the public network address for the destination node;
encrypting network traffic for transporting at least from the source node to the destination node through the virtual circuit,
wherein the method is performed by one or more processors.

2. The method of claim 1 wherein the source device is associated with a switching device having a public network address.

3. The method of claim 1 wherein the destination device is associated with a switching device having a public network address.

4. A method for managing a particular virtual circuit between a source node and a destination node that was created in response to a request for secure delay-sensitive network traffic between a source device having a private network address at the source node and a destination device having a private network address at the destination node, the method comprising the computer-implemented steps of:
in response to receiving an indication that the particular virtual circuit is no longer needed for network traffic between the source device and the destination device, determining whether any devices other than the source and destination devices are using the particular virtual circuit for transporting delay-sensitive network traffic;
wherein the particular virtual circuit comprises a virtual-next-hop server, which is a physical next-hop to the destination node and a virtual next-hop from the source node:
wherein the virtual-next hop server is identified by its virtual tunnel IP address, which is not a public network address for the virtual-next hop server;
if no devices other than the source and destination devices are using the particular virtual circuit for transporting delay-sensitive network traffic, then determining whether there is a teardown policy associated with the particular virtual circuit that specifies rules regarding elimination of the particular virtual circuit;
if no teardown policy is associated with the particular virtual circuit, then eliminating the virtual circuit; and
if a teardown policy is associated with the particular virtual circuit, then determining from the associated teardown policy whether the particular virtual circuit should be eliminated;
wherein the method is performed by one or more processors.

5. A computer-readable non-transitory volatile or non-volatile storage medium storing one or more sequences of instructions for dynamically securing delay-sensitive network traffic, which instructions, when executed by one or more processors, cause the one or more processors to perform:
receiving a request for secure network traffic between a source device at a source node and a destination device at a destination node;
obtaining from a virtual next-hop server a public network address for the destination node;
wherein the virtual-next-hop server is a physical next-hop to the destination node and a virtual next-hop from the source node;
wherein the virtual-next-hop server is identified by its virtual tunnel IP address, which is not a public network address for the virtual-next-hop server;
creating, in response to the request, a virtual circuit between the source node and the destination node based on the public network address for the destination node;
encrypting network traffic for transporting at least from the source node to the destination node through the virtual circuit.

6. The computer-readable medium of claim 5 wherein the source device is associated with a switching device having a public network address and wherein the step of creating a virtual circuit in response to the request is based on the source device.

7. The computer-readable medium of claim 5 wherein the destination device is associated with a switching device having a public network address and wherein the step of creating a virtual circuit in response to the request is based on the destination device.

8. A computer-readable non-transitory volatile or non-volatile storage medium storing one or more sequences of instructions for managing a particular virtual circuit between a source node and a destination node that was created in response to a request for secure delay-sensitive network traffic between a source device having a private network address at the source node and a destination device having a private network address at the destination node, which instructions, when executed by one or more processors, cause the one or more processors to perform:
in response to receiving an indication that the particular virtual circuit is no longer needed for network traffic between the source device and the destination device, determining whether any devices other than the source and destination devices are using the particular virtual circuit for transporting delay-sensitive network traffic;
wherein the particular virtual circuit comprises a virtual-next-hop server, which is a physical next-hop to the destination node and a virtual-next-hop from the source node:
wherein the virtual-next hop server is identified by its virtual tunnel IP address, which is not a public network address for the virtual-next hop server;
if no devices other than the source and destination devices are using the particular virtual circuit for transporting delay-sensitive network traffic, then determining whether there is a teardown policy associated with the particular virtual circuit that specifies rules regarding elimination of the particular virtual circuit;
if no teardown policy is associated with the particular virtual circuit, then eliminating the virtual circuit; and
if a teardown policy is associated with the particular virtual circuit, then determining from the associated teardown policy whether the particular virtual circuit should be eliminated.

9. An apparatus for dynamically securing delay-sensitive network traffic, comprising:

one or more processors;

means for receiving a request for secure network traffic between a source device at a source node and a destination device at a destination node;

means for obtaining from a virtual next-hop server a public network address for the destination node;

wherein the virtual-next-hop server is a physical next-hop to the destination node and a virtual next-hop from the source node;

wherein the virtual-next-hop server is identified by its virtual tunnel IP address, which is not a public network address for the virtual-next-hop server;

means for creating, in response to the request, a virtual circuit between the source node and the destination node based on the public network address for the destination node;

means for encrypting network traffic for transporting at least from the source node to the destination node through the virtual circuit.

10. The apparatus of claim 9 wherein the source device is associated with a switching device having a public network address.

11. The apparatus of claim 9 wherein the destination device is associated with a switching device having a public network address.

12. An apparatus for managing a particular virtual circuit between a source node and a destination node that was created in response to a request for secure delay-sensitive network traffic between a source device having a private network address at the source node and a destination device having a private network address at the destination node, comprising:

one or more processors;

means for receiving an indication that the particular virtual circuit is no longer needed for network traffic between the source device and the destination device;

wherein the particular virtual circuit comprises a virtual-next-hop server, which is a physical next-hop to the destination node and a virtual next-hop from the source node:

wherein the virtual-next hop server is identified by its virtual tunnel IP address, which is not a public network address for the virtual-next hop server;

means for determining whether any devices other than the source and destination devices are using the particular virtual circuit for transporting delay-sensitive network traffic;

means for determining whether there is a teardown policy associated with the particular virtual circuit that specifies rules regarding elimination of the particular virtual circuit in response to a determination that no devices other than the source and destination devices are using the particular virtual circuit for transporting delay-sensitive network traffic;

means for eliminating the virtual circuit, if no teardown policy is associated with the particular virtual circuit; and means for determining from the associated teardown policy whether the particular virtual circuit should be eliminated, if a teardown policy is associated with the particular virtual circuit.

13. An apparatus for dynamically securing delay-sensitive network traffic, comprising:

a network interface that is coupled to the data network for receiving one or more packet flows therefrom;

a processor;

a computer-readable volatile or non-volatile storage medium coupled to the processor and storing one or more stored sequences of instructions which, when executed by the processor, cause the processor to carry out the steps of:

receiving a request for secure network traffic between a source device at a source node and a destination device at a destination node;

obtaining from a virtual next-hop server a public network address for the destination node;

wherein the virtual-next-hop server is a physical next-hop to the destination node and a virtual next-hop from the source node;

wherein the virtual-next-hop server is identified by its virtual tunnel IP address, which is not a public network address for the virtual-next-hop server;

creating, in response to the request, a virtual circuit between the source node and the destination node based on the public network address for the destination node;

encrypting network traffic for transporting at least from the source node to the destination node through the virtual circuit.

14. The apparatus of claim 13 wherein the source device is associated with a switching device having a public network address.

15. The apparatus of claim 13 wherein the destination device is associated with a switching device having a public network address.

* * * * *